United States Patent [19]

Koivunen

[11] 4,237,749

[45] Dec. 9, 1980

[54] MULTI-SPEED POWER TRANSMISSION

[75] Inventor: Erkki A. Koivunen, Livonia, Mich.

[73] Assignee: General Motors Corporation, Detroit, Mich.

[21] Appl. No.: 38,339

[22] Filed: May 11, 1979

[51] Int. Cl.³ .................... F16H 57/10; F16D 21/02; F16D 25/10; F16D 25/061

[52] U.S. Cl. .................. 74/763; 192/48.8; 192/87.11; 192/70.11

[58] Field of Search ............... 74/759, 753, 762, 763, 74/674, 781, 789; 192/48.1, 48.8, 87.1, 87.11, 70.11, 3.52

[56] References Cited

U.S. PATENT DOCUMENTS

| | | | |
|---|---|---|---|
| 2,010,288 | 8/1935 | Bartelme | 192/48.1 |
| 2,043,784 | 6/1936 | Tyler | 192/48.8 |
| 2,775,330 | 12/1956 | Schjolin | 192/87.16 |
| 3,138,964 | 6/1964 | Stockton | 192/87.11 |
| 3,160,030 | 12/1964 | Wickman | 192/87.11 |
| 3,164,232 | 1/1965 | General | 192/87.1 |
| 3,602,055 | 8/1971 | Hause et al. | 74/753 X |
| 3,886,816 | 6/1975 | De Feo et al. | 74/674 X |
| 4,086,827 | 5/1978 | Chana | 74/753 |
| 4,186,827 | 2/1980 | Spanke | 192/48.1 X |

*Primary Examiner*—C. J. Husar
*Assistant Examiner*—Philip W. Thor
*Attorney, Agent, or Firm*—Donald F. Scherer

[57] ABSTRACT

A four-speed planetary transmission has three friction clutches which are selectively engageable in pairs or simultaneously to provide a drive connection between the transmission input and the planetary gearing during the four forward speeds. One apply piston selectively engages two of the friction clutches and a second apply piston selectively engages the other friction clutch and one of the two friction clutches. Simultaneous actuation of both apply pistons causes engagement of all three clutches. A one-way clutch is disposed in series drive relation with the friction clutch that is selectively engageable by both apply pistons.

3 Claims, 1 Drawing Figure

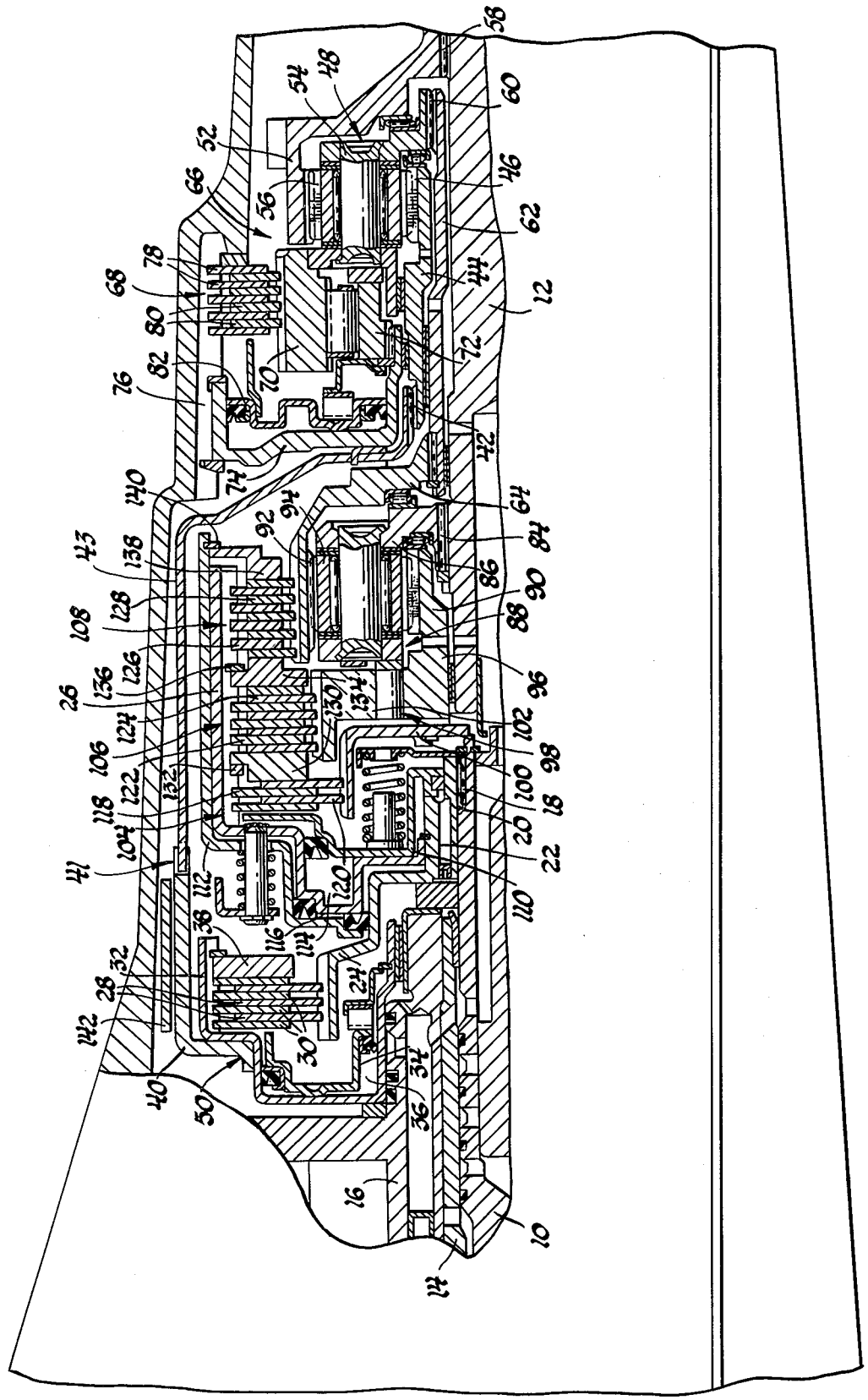

MULTI-SPEED POWER TRANSMISSION

This invention relates to power transmissions and more particularly to multi-speed transmissions having selectively engageable friction clutches.

Prior art transmissions, such as that shown in U.S. Pat. No. 4,086,827 to Chana, issued May 2, 1978, have a pair of clutches engaged by one apply piston and a third clutch engaged by another apply piston. In the alternative, each of the three clutches may have a separate apply piston. The apply pistons are selectively pressurized to provide a drive connection between the transmission input such as a torque converter and a planetary gearing arrangement.

The present invention provides a clutch arrangement having two apply pistons which may be selectively pressurized to engage a first and second of the clutches or the second and third of the clutches or all three clutches simultaneously.

It is therefore an object of this invention to provide an improved planetary transmission having three friction clutches which are selectively engaged in pairs by two independently operable apply pistons and wherein one of the friction clutches is in series drive relation with a one-way drive device.

It is another object of this invention to provide an improved planetary transmission having three friction clutches which are selectively engaged in pairs by two independently operable apply pistons and wherein each of the friction clutches has at least one friction member splined to an input housing and wherein the friction clutches are separated by backup plates also splined to the input housing in such a manner as to permit one backup plate to function as a reaction surface for the first and second of the clutches and another backup plate to function as a reaction surface for the second and third of the clutches.

These and other objects and advantages of the present invention will be more apparent from the following description and drawing which is a cross-sectional view of a planetary transmission incorporating the present invention.

The transmission includes an input shaft 10 adapted to be driven by the turbine member of a conventional torque converter, not shown, and an output shaft 12 adapted to be connected to drive the vehicle wheels, not shown. The input shaft 10 is rotatably supported in a conventional stator shaft 14 which is supported in a conventional pump housing 16. The input shaft 10 has formed thereon a spline 18 which meshes with a spline 20 on a clutch hub 22. The clutch hub 22 has secured thereto or otherwise formed integrally therewith an externally splined clutch drum 24 and an internally splined clutch drum 26. A plurality of friction discs 28 are splined to the clutch drum 24 and are interleaved with a plurality of friction discs 30 which are splined to a clutch housing 32 in which is slidably disposed a clutch piston 34 which cooperates with the housing 32 to form a clutch apply chamber 36.

A backup plate 38 is splined to the clutch housing 32 to provide a reaction surface for the friction discs 28 and 30 when the piston 34 is energized by fluid pressure in chamber 36. The clutch housing 32 is secured to a drum 40 which is connected through a drive tang at 41 to a drum 43, which drum 43 is splined at 42 to a sun gear shaft 44 on which is formed a sun gear member 46 which is a component in a planetary gear set generally designated 48. The clutch apply piston 34, friction discs 28 and 30 and backup plate 38 cooperate with the hub 24 and housing 32 to form a reverse clutch generally designated 50.

The planetary gear set 48 includes the sun gear 46, a ring gear 52 and a planet carrier 54 on which is rotatably supported a plurality of planet pinions 56 which are in meshing relation with the sun gear 46 and ring gear 52. The ring gear 52 is drivingly connected through a spline 58 with the output shaft 12 while the carrier 54 is connected through a spline 60 to a sleeve shaft 62 which in turn is connected to a clutch hub 64. The carrier 54 is also connected to a one-way device generally designated 66 and a friction brake general designated 68.

The one-way device 66 has an outer race 70, connected to the carrier 54, and an inner race 72 which is splined to a bulkhead 74 secured to the transmission housing 76. The one-way device 66 prevents rotation of the carrier in one direction but permits free rotation in the other direction.

The brake 68 includes a plurality of friction discs 78 splined to the transmission housing 76 and interleaved with a plurality of friction discs 80 splined to the outer race 70. The friction brake 68 is selectively engaged in a conventional manner by a piston assembly 82 which is slidably disposed in the bulkhead 74. When the brake 68 is engaged, rotation of the carrier 54 in both directions is prevented in a well-known manner.

The output shaft 12 is splined at 84 to a planetary carrier 86 which is a component in a planetary gear set generally designated 88 which also includes a sun gear 90, a ring gear 92, formed integrally with or otherwise secured to clutch hub 64, and a plurality of pinion gears 94 which are rotatably supported on the carrier 86 in meshing relationship with the sun gear 90 and ring gear 92. The sun gear 90 is secured to an inner race 96, of a one-way clutch generally designated 98, and a clutch hub 100. The one-way clutch 98 has an outer race 102.

The clutch drum 26 houses three clutches generally designated 104, 106 and 108. The clutch drum 26 also slidably supports a clutch apply piston 110 interior thereto and a clutch apply piston 112 on the exterior thereof. The clutch apply piston 110 cooperates with the clutch drum 26 to form a clutch apply chamber 114 while the clutch apply piston 112 cooperates with the clutch drum 26 to form a clutch apply chamber 116.

The clutch 104 includes a plurality of friction discs 118 which are splined to the clutch drum 26 and interleaved with a plurality of friction discs 120 splined to the clutch hub 100. The clutch 106 includes a plurality of friction discs 122 which are splined to the clutch drum 26 and are interleaved with a plurality of friction discs 124 splined to the outer race 102 of one-way clutch 98. The clutch 108 includes a plurality of friction discs 126 splined to the clutch drum 26 and interleaved with a plurality of friction discs 128 splined to the clutch drum 64. A pressure plate 130 is splined to the clutch drum 26 intermediate the friction discs for clutches 104 and 106 and is limited in movement in the lefthand direction, as viewed in the drawing, by a locking ring 132. A pressure plate 134 is splined to the clutch drum 26 intermediate the friction discs of clutches 106 and 108 and is limited in movement in the righthand direction, as viewed in the drawing, by a locking ring 136. A pressure plate 138 is secured to the clutch apply piston 112 by a locking ring 140.

When fluid pressure is admitted to chamber 114, the apply piston 110 is moved in the righthand direction to cause frictional engagement between the discs 118 and 120 and also transmits a clutch apply force through pressure plate 130 to the friction discs 122 and 124 of clutch 106 which are limited in movement in the righthand direction by pressure plate 134 and lock ring 136. When the clutch piston 110 is pressurized, a drive connection from input shaft 10 to sun gear 90 is provided through both friction clutches 104 and 106 and the one-way clutch 98.

When the chamber 116 is pressurized, the apply piston 112 is moved in a lefthand direction such that pressure plate 138 causes frictional engagement between friction discs 126 and 128 and also transmits an engagement force through pressure plate 134 through friction discs 122 and 124 of clutch 106. Actuation of clutch apply piston 112 provides a drive connection from input shaft 10 to both ring gear 92 and planetary carrier 54. A drive connection from input shaft 10 to the outer race 102 of one-way clutch 98 is also provided.

The planetary gearing arrangement provides four forward speeds including an overdrive and one reverse speed. The first forward speed is provided by engaging friction clutches 104 and 106 which connect the input shaft 10 to sun gear 90. When the sun gear 90 is driven forwardly, the planet carrier 54 and ring gear 92 are urged in a reverse direction such that actuation of one-way brake 66 prevents such rotation so that carrier 86 and therefore output shaft 12 are driven forwardly.

The second forward speed is established by energization of a conventional brake band 142 which encirles the outer periphery of drum 40 and prevents rotation of sun gear 46. With sun gear 46 established as a reaction member, the planet carrier 54 and therefore ring gear 92 are driven in a forward direction of rotation which results in an increase in speed of the carrier 86 and therefore output shaft 12.

The third forward speed ratio is established by releasing brake band 142 and energizing clutch piston 116 thereby engaging clutch 108 while clutches 104 and 106 remain engaged. Engagement of all three clutches 104, 106 and 108 results in a direct drive ratio through planetary gear set 88.

The fourth forward speed ratio is established through the engagement of brake band 142 and the release of pressure in chamber 114 which permits clutch piston 110 to move to a disengaged position. With fluid pressure relieved in chamber 114, the clutches 106 and 108 are engaged while clutch 104 is disengaged. Since the clutch 106 is connected to the sun gear 90 through the one-way clutch 98, the sun gear 90 is permitted to overrun the input. The engagement of clutch 108 and brake band 142 establish carrier 54 and sun gear 46 as input and reaction members, respectively, such that an overdrive ratio is established in planetary gear set 48.

The reverse drive ratio is established by engaging clutch 50 and brake 68 whereby sun gear 46 and carrier 54 are established as input and reaction members, respectively, in the planetary gear set 48.

From the above description, it is readily apparent that the clutches 104 and 106 may be engaged by clutch piston 110 and plate 134, or clutches 106 and 108 can be engaged by clutch piston 112 and plate 130, or all three clutches 104, 106 and 108 can be engaged simultaneously by actuation of both clutch pistons 110 and 112. Since the plate 134 is limited in righthand movement, a clutch apply force generated by piston 110 cannot be transmitted to clutch 108. Since plate 130 is limited in lefthand movement, the clutch apply force transmitted by clutch piston 112 cannot be imposed on clutch 104.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A power transmission comprising: input means; output means; a pair of interconnected planetary gear means operatively connected between said input means and said output means and being selectively controllable for providing four forward speed ratios between said input means and said output means; first friction clutch means for selectively connecting one gear member of one planetary gear means with said input means; second friction clutch means; one-way drive means in series drive relation with said second friction clutch means and being drivingly connected with the one gear member of the one planetary gear means and coacting with said second friction clutch for selectively connecting said input means with the one gear member for a one-way input drive; third friction clutch means for selectively connecting said input means with both another gear member of the one planetary gear means and one gear member of the other planetary gear means; first clutch apply means for simultaneously engaging said first friction clutch means and said second friction clutch means; and second clutch apply means for simultaneously engaging said second friction clutch means and said third friction clutch means.

2. A power transmission comprising: input means; output means; a pair of interconnected planetary gear means operatively connected between said input means and said output means and being selectively controllable for providing four forward speed ratios between said input means and said output means; first friction clutch means for selectively connecting one gear member of one planetary gear means with said input means; second friction clutch means; one-way drive means in series drive relation with said second friction clutch means and being drivingly connected with the one gear member of the one planetary gear means and coacting with said second friction clutch for selectively connecting said input means with the one gear member for a one-way input drive; third friction clutch means for selectively connecting said input means with both another gear member of the one planetary gear means and one gear member of the other planetary gear means; first clutch apply means for simultaneously engaging said first friction clutch means and said second friction clutch means; second clutch apply means for simultaneously engaging said second friction clutch means and said third friction clutch means; first plate means intermediate said first and second friction clutch means for transmitting an apply force from said first clutch means to said second friction clutch; and second plate means intermediate said second and third friction clutch means for transmitting an apply force from said second clutch apply means to said second friction clutch.

3. A power transmission comprising: input means; output means; a pair of interconnected planetary gear means operatively connected between said input means and said output means and being selectively controllable for providing four forward speed ratios between said input means and said output means; first friction clutch means for selectively connecting one gear member of one planetary gear means with said input means; second friction clutch means; one-way drive means in series drive relation with said second friction clutch means and being drivingly connected with the one gear member of the one planetary gear means and coacting with said second friction clutch for selectively connecting said input means with the one gear member for a one-way input drive; first plate means intermediate said first and second friction clutch means; means limiting the movement of said first plate in one direction; third friction clutch means for selectively connecting said input means with both another gear member of the one planetary gear means and one gear member of the other planetary gear means; second plate means intermediate said second and third friction clutch means; means limiting the movement of said second plate in a direction opposite to said first plate means; first clutch apply means for simultaneously engaging said first friction clutch means and said second friction clutch means with said second plate means providing a reaction surface; and second clutch apply means for simultaneously engaging said second friction clutch means and said third friction clutch means with said first plate means providing a reaction surface.

* * * * *